Aug. 30, 1927.
B. W. FLINTROP
BARN MANURE CONVEYER
Filed March 17, 1926
1,640,825
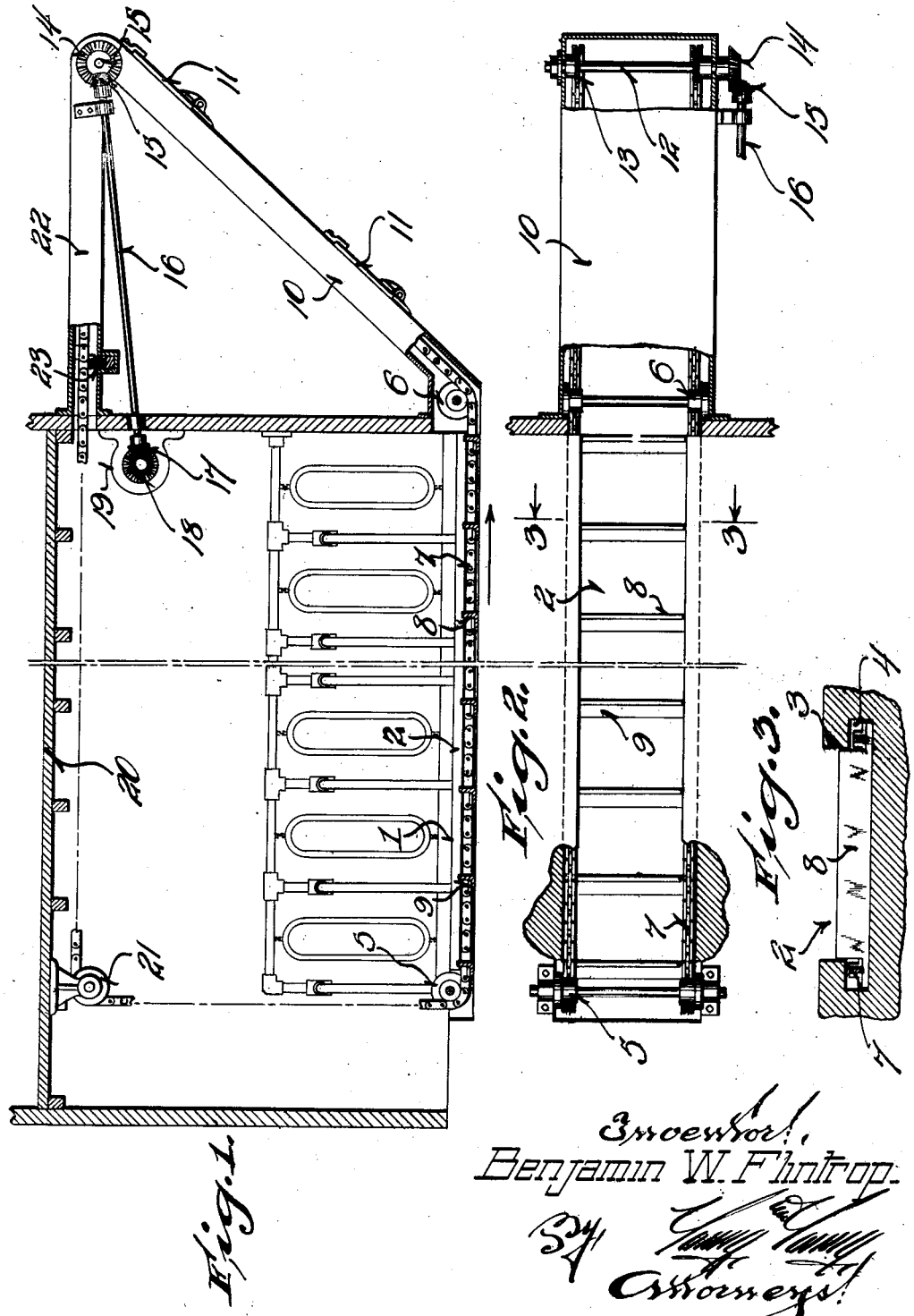

Patented Aug. 30, 1927.

1,640,825

UNITED STATES PATENT OFFICE.

BENJAMIN W. FLINTROP, OF HALES CORNERS, WISCONSIN.

BARN MANURE CONVEYER.

Application filed March 17, 1926. Serial No. 95,231.

This invention relates to a manure conveyer for barns. In the usual construction of barns, it is the practice to provide a gutter or trough of channel shape rearwardly of the stalls. Various means have been employed for cleaning this trough, but these means have not proven satisfactory as they are either ineffective or else relatively complicated and difficult of operation.

This invention is designed to overcome the defects noted above, and objects of this invention are to provide a manure conveyer for barns which is highly effective in operation, which is very simple in construction, and which is strong and reliable and not likely to get out of order.

Further objects are to provide a manure conveyer for barns which will clean out the trough or channel, which will elevate the manure and dump it at any desired height into wagons or other devices, or which will elevate it to a sufficient height so that it will be dumped into a pile outside the barn.

An embodiment of the invention is shown in the accompanying drawings, in which:

Figure 1 is a vertical sectional view through a barn equipped with the device.

Figure 2 is an enlarged plan view of the channel with the conveyer in position, such view being partly in section.

Figure 3 is a transverse sectional view of the structure shown in Figure 2, such view corresponding to a section on the line 3—3 of Figure 2.

Referring to the drawings, it will be seen that the barn is provided with a concrete or other base 1 within which a trough 2 is formed. This trough is set down below the floor level and is preferably provided with overhanging marginal flanges 3 which define grooves 4 in the sides of the channel as most clearly shown in Figure 3. A pair of guiding rollers or sprocket wheels 5 and 6 are mounted at opposite ends of the channel, and if desired, the guiding roller 6 may be mounted outside of the outline of the barn as shown in Figure 1. An endless conveyer 7 extends through the channel 2, and is guided about the rollers 5 and 6. This conveyer is preferably composed of a pair of side chains between which angle irons or scrapers 8 are positioned. These angle irons preferably have their bottom flanges extending rearwardly as indicated at 9 in Figure 2. These flanges may be secured to the chains in any suitable manner.

An upwardly inclined chute 10 projects from the end of the barn and encloses the conveyer 7. This chute is provided with a plurality of doors 11 on its under side which may be held in closed position by suitable latches. At the upper end of the chute 10, a transverse shaft 12 is positioned, and is provided with sprocket wheels 13 adjacent opposite ends. These sprocket wheels engage the chains of the conveyer and transmit motion to such conveyer. The shaft 12 carries at its outer end a beveled gear 14 which meshes with a beveled pinion 15 carried by the shaft 16. This shaft extends into the barn and carries a beveled gear 17 at its inner end. This latter beveled gear meshes with a beveled gear 18 driven by an electric or other motor 19.

From the sprocket wheels 13, the conveyer extends across the top of the barn beneath the roof 20 as shown in Figure 1, and passes over rollers or sprocket wheels 21. From this point it passes downwardly to the rollers, or sprocket wheels 5.

It is to be noted that the horizontal chute or enclosure 22 for the conveyer is provided with a brush 23 which operates upon the conveyer as it is drawn thereover. This brush dislodges any adhering material and prevents the carrying of this material into the barn.

In operation, it is merely necessary to start the motor 19 and open one of the doors 11. The manure is scraped from the trough by the angle iron scrapers 8, and is passed upwardly into the chute 10. From thence, it is discharged through the desired doorway.

It is to be particularly noted, from reference to Figures 2 and 3, that the side chains and the projecting ears of the angle iron scrapers are housed beneath the over-hanging marginal flanges of the channel. This protects the chains and the ears of the scrapers from damage. It is to be noted further, that the power is applied to the upper outer end of the conveyer so as to lift the conveyer with its load upwardly along the slanting chute 10. Further, it is to be noted that the upper rear guiding means is located directly over the rear end of the channel so that the weight of the conveyer aids in returning such conveyer to its starting point.

It will be seen that a very simple and substantial type of cleaner for the trough or channel of barns has been provided by this invention, and it will be seen further that the device is of very sturdy and rugged formation and is not likely to get out of order.

Although the invention has been described in considerable detail, such description is intended as illustrative rather than limiting as the invention may be variously embodied and as the scope of such invention is to be determined as claimed.

I claim:

1. The combination of a barn having a floor and having a channel inset below the floor line, said channel having inwardly directed overhanging marginal flanges, an endless power-driven conveyer consisting of a pair of spaced chains mounted below said flanges, and scrapers positioned between said chains and having ears projecting below said flanges, guiding members for leading said conveyer into and out of said channel, an upwardly and outwardly projecting chute through which said conveyer is led, said chute having discharge doors, guiding means located adjacent the upper portion of said barn and over which said conveyer is passed, said last guiding means being located approximately directly over the rear end of said channel.

2. The combination of a barn having a floor and having a channel inset below the floor line, said channel having inwardly directed overhanging marginal flanges, an endless conveyer consisting of a pair of spaced chains mounted below said flanges, and scrapers positioned between said chains and having ears projecting below said flanges, guiding members for leading said conveyer into and out of said channel, an upwardly and outwardly projecting chute through which said conveyer is led, said chute having discharge doors, driving means in the upper end of said chute, a motor operatively connected to said driving means, guiding means located adjacent the upper portion of said barn and over which said conveyer is passed, said last guiding means being located approximately directly over the rear end of said channel.

In testimony that I claim the foregoing I have hereunto set my hand at Hales Corners, in the county of Milwaukee and State of Wisconsin.

BENJAMIN W. FLINTROP.